Nov. 8, 1966         J. S. JARVIS         3,283,487

GRAIN HARVESTING MACHINES

Filed July 8, 1964         4 Sheets-Sheet 3

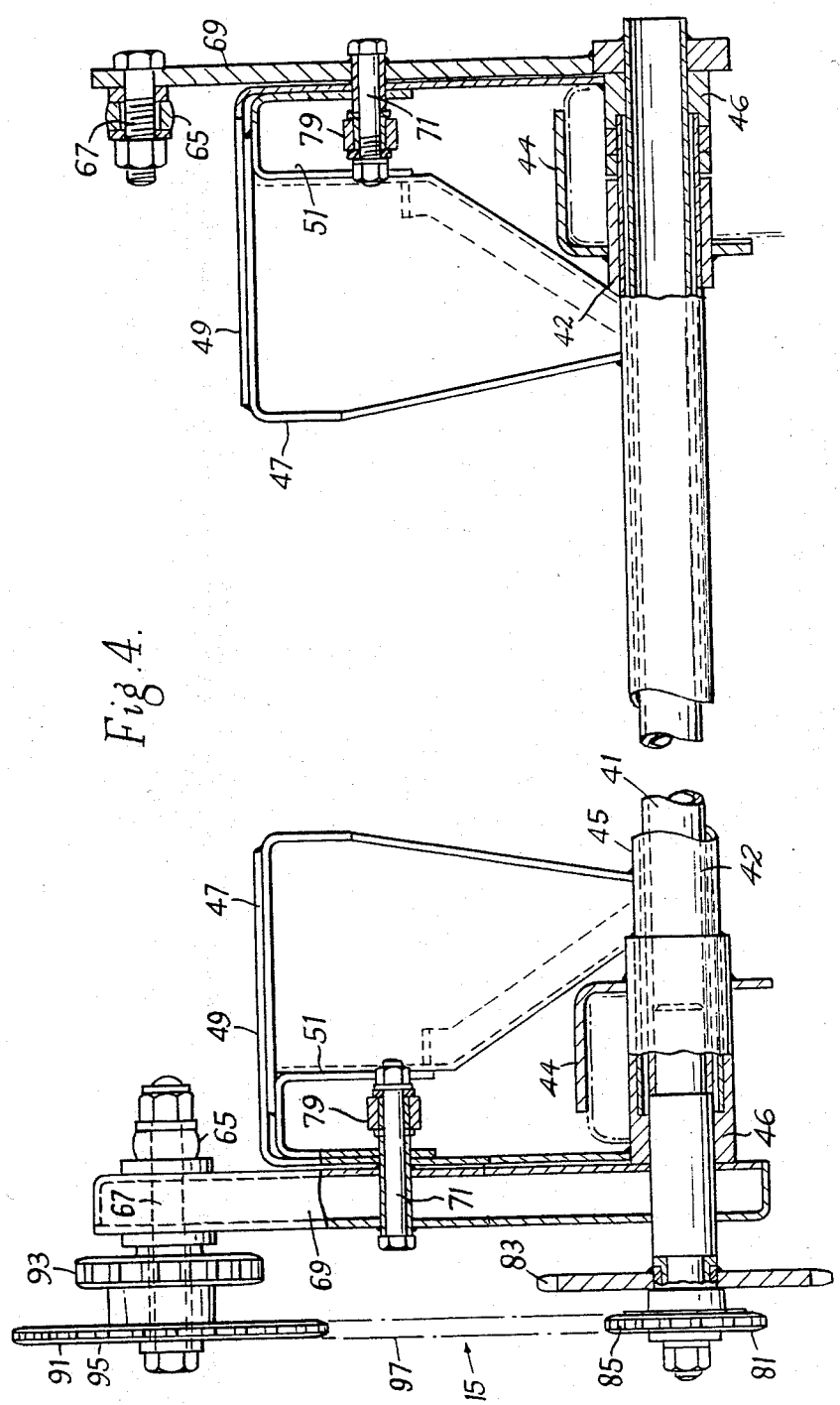

United States Patent Office 3,283,487
Patented Nov. 8, 1966

3,283,487
GRAIN HARVESTING MACHINES
John S. Jarvis, Orwell Works, Ipswich, Suffolk, England, assignor to Ransomes, Sims & Jefferies Limited, Ipswich, Suffolk, England, a British company
Filed July 8, 1964, Ser. No. 381,087
Claims priority, application Great Britain, July 10, 1963, 27,314/63
7 Claims. (Cl. 56—222)

This invention relates to grain harvesting machines of the kind having at a forward end thereof a reel which is utilised to assist in the feeding of the crop to be harvested onto the cutting and gathering mechanism of the machine. The reel which is driven by endless band means from a driven lay shaft may be of the bat or sail type which is used with upright crops and serves solely to effect feeding of the crop onto the cutting and gathering mechanism, or, the reel may be of the kind provided with tines which is used wtih laid crops and serves to lift the crop as well as to feed it to the cutting and gathering mechanism.

It is important in order to enable the harvesting machine to deal to best advantage with upright crops of different height or with crops which are laid in differing degrees and directions that the reel should be adjustable both as to its vertical height off the ground and as to the extent to which it is disposed forwardly of the cutting mechanism. Whilst the adjustment of the vertical height of the reel off the ground can be readily carried out without affecting the tension in the driving band means cooperating with the reel, the mechanism for adjusting the reel in the fore and aft direction desirably requires to incorporate means for maintaining the tension in the reel driving band means whilst the position of the reel is being adjusted in the fore and aft direction.

It is accordingly an object of this invention to provide a mechanism for adjusting the position of the reel in the fore and aft direction whilst maintaining tension in the reel driving band means constant or substantially constant.

According to the present invention, mechanism for effecting movement of the reel of a grain harvesting machine in a direction fore and aft of the machine includes a reel supporting arm, a reel supporting bearing carried on and movable longitudinally with respect to the reel supporting arm, a lever pivotally mounted for rotation about an axis parallel with and rearwardly disposed with respect to the reel axis, a link connected with the lever at a point thereof spaced from the pivotal axis of the lever and with the reel supporting bearing, means for effecting pivotal movement of the lever, and, for the purpose of cooperating with reel driving endless band means, first wheel means rotatably mounted relative to the pivotal axis of the lever, second wheel means carried on the lever and rotatable about an axis spaced from the pivotal axis of the lever and third wheel means adapted to be secured to the reel.

Suitably, the reel driving endless band means comprise two endless bands one of which bands cooperates with a wheel element of the first wheel means and a wheel element of the second wheel means whilst the second band cooperates with a further wheel element of the second wheel means and with the third wheel means.

Preferably, the link is connected to the lever so as to be pivotal about the axis of rotation of the second wheel means.

Preferably also, an hydraulic ram is provided for effecting pivotal movement of the lever. Advantageously, the lever carries a pin which engages in a slot in the reel supporting arm.

The invention will now be described, by way of example, with reference to the accompanying drawings, in which:

FIGURE 4 is an end elevation partly in section of the mechanism of FIGURES 2 and 3.

Figure 1:
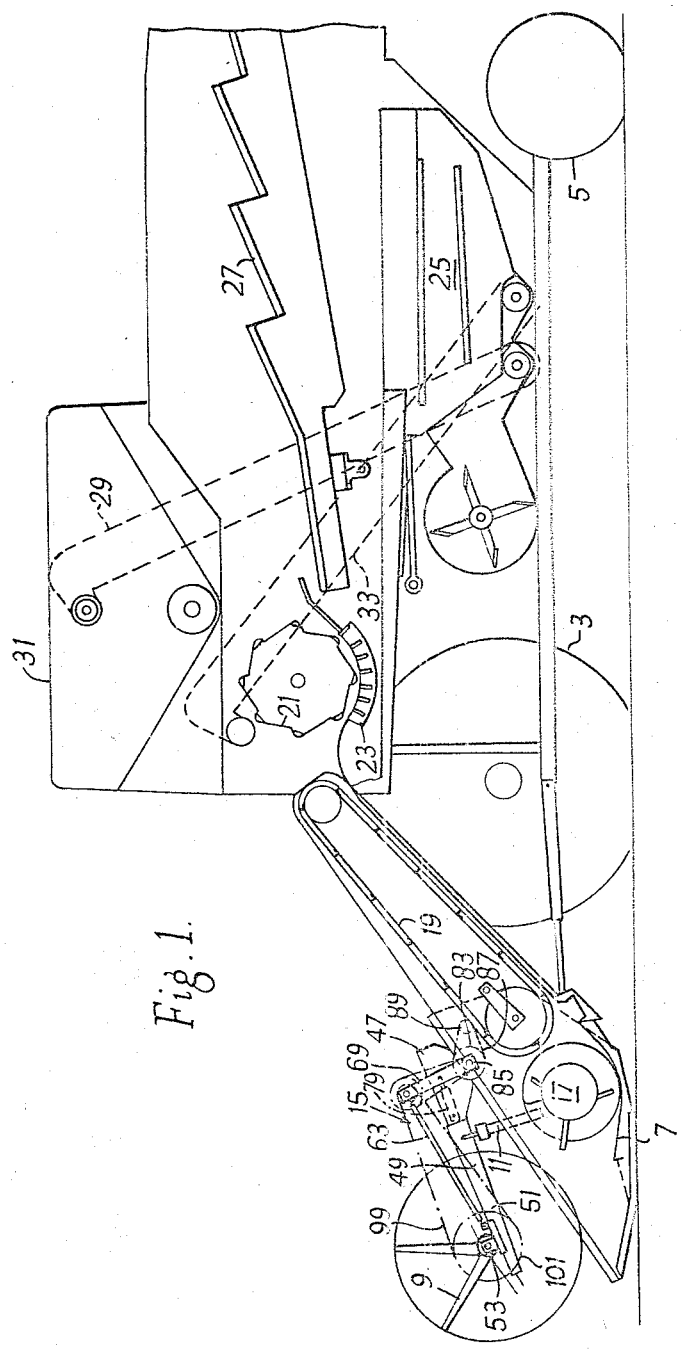
FIGURE 1 is a somewhat diagrammatic side view of a combine harvester machine which incorporates the invention.

Referring first to FIGURE 1, a combine harvester machine is supported on ground engaging front wheels 3 and rear wheels 5 and includes at its forward end a feed table 7 and for feeding crop towards the feed table a reel 9 the height of which relative to the feed table is adjustable by means of hydraulic ram 11.

Mechanism generally indicated at 15 is provided for effecting adjustment of the reel in a direction fore and aft of the machine. On the feed table 7 is a cutter mechanism (not shown) to the rear of which is a feed auger 17 by the agency of which crop is fed to the lower end of a feed elevator 19. The elevator 19 supplies the crop to a drum 21 and concave 23 where the principal threshing action takes place and grain passing through the concave is conveyed for cleaning purposes to the dressing shoe 25 whilst straw discharged at the rear of the drum passes to straw walkers 27 for separation therefrom of residual grain. The straw is finally discharged at the rear of the machine whilst a grain elevator 29 conveys grain from the dressing shoe to a grain tank 31 and a tailings elevator 33 conveys unseparated grain and small pieces of straw from the dressing shoe to the inlet side of the drum and concave.

Figure 2:
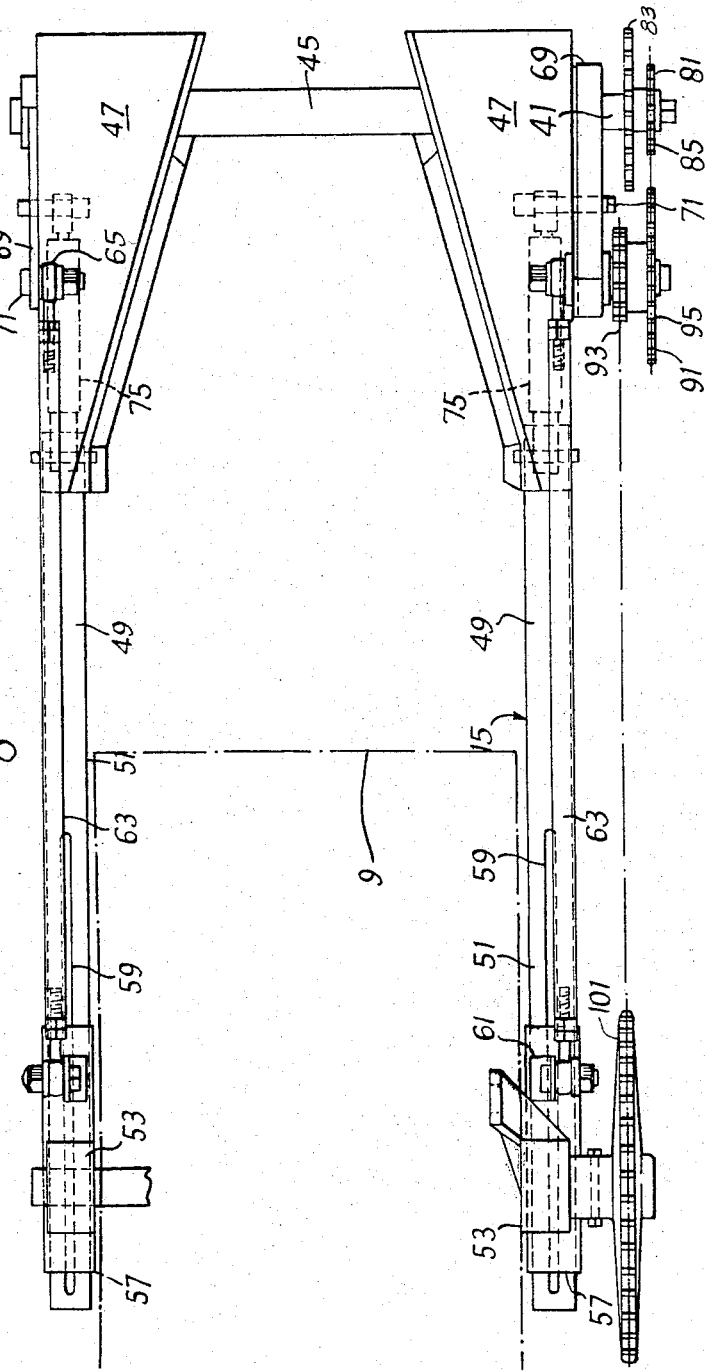
FIGURE 2 is a plan view of mechanism according to the invention for effecting movement in the fore and aft direction of the reel of the machine of FIGURE 1.
Figure 3:
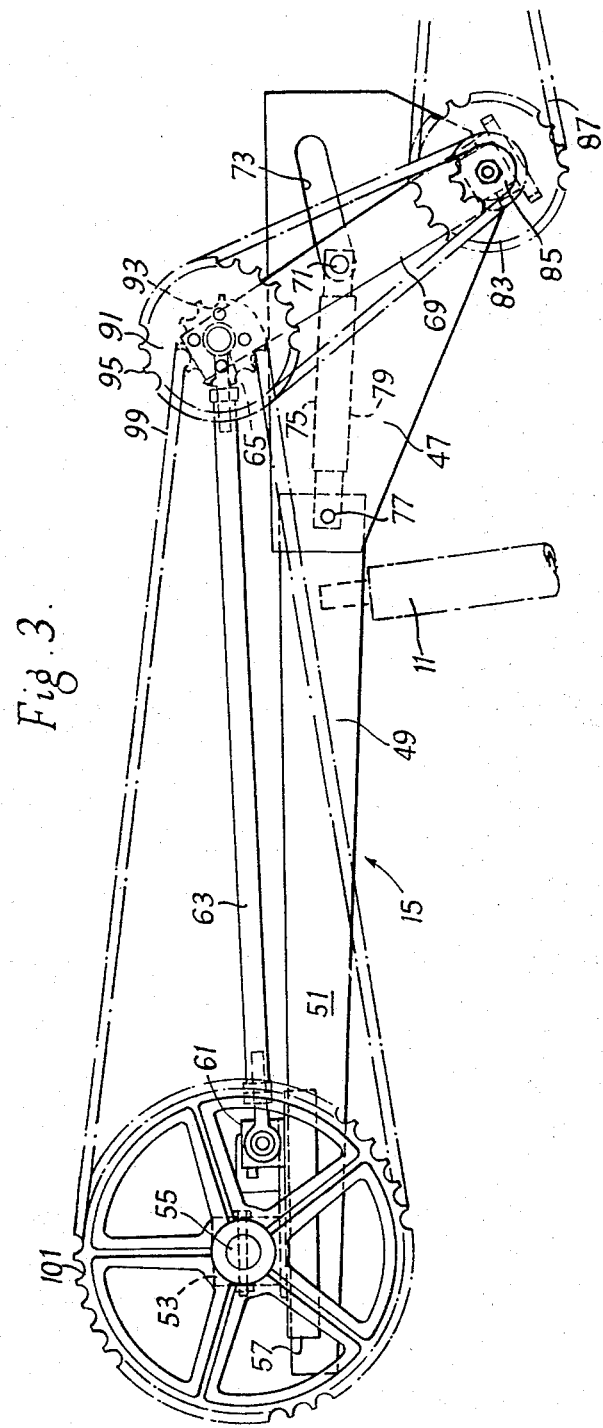
FIGURE 3 is a side elevation of the mechanism of FIGURE 1.

Referring to FIGURES 2 to 4, in which the mechanism 15 is shown in greater detail, a shaft 41 extends along an axis tranverse to the machine and coaxially within a hollow shaft 45 mounted in bearings 42. The hollow shaft 45 is secured as by welding to rear parts 47 of spaced, parallel reel supporting arms 49. The bearings 42 are carried by brackets 44 mounted on the sides of the feed table. Coaxial with the bearings 42 are bearings 46 which are mounted on the reel supporting arms 49 and receive the shaft 41. The rear part 47 of each reel supporting arm is forwardly tapering and of inverted channel section whilst a forward part 51 of each arm 49 is of uniform inverted channel section. On the forward part 51 of each reel supporting arm is carried a reel supporting bearing 53 in which is engaged the reel axle 55 and each reel supporting bearing is carried on a downwardly flanged base plate 57 slidably movable along its corresponding reel supporting arm forward part 51 to an extent determined by the length of a slot 59 formed in the part 51 and in which a depending part of the plate 57 cooperates.

Pivotally connected to an upstanding element 61 on the baseplate 57 of each reel supporting bearing 53 is the forward end of a link 63 the rear end of which terminates in an eye 65 which is pivotally carried on a short dead shaft 67 projecting laterally from an upper part of a lever 69 which at its lower end is secured to a part of the shaft 41 which projects outwardly from the hollow shaft 45 to which are secured the reel supporting arms 49. The lever 69 at one side of the feed table is a flat bar whilst that at the other side of the feed table is of box shaped section. Each lever 69 carries intermediate its ends a pin 71 which engages in a slot 73 formed in the rear part 47 of the adjacent reel supporting arm 49. On that part of the pin 71 which projects through the slot 73 in the arm is engaged an eye formed on the end of the piston rod of an hydraulic ram 79 the cylinder 75 of which is pivotally secured as indicated by pin 77 to the reel supporting arm.

It will be appreciated that by supplying hydraulic fluid to the rams 79 respectively associated with the reel supporting arms 49, the levers 69 are pivoted about the axis of the shaft 41 and the links 63 secured to the levers 69 are thereby moved to effect longitudinal movement with respect to the reel supporting arms 49 of the reel supporting bearing 53. In this way adjustment of the reel axle in the fore and aft direction is carried out. It will be apparent, moreover, that use of the rams 79 enables the adjustment of the reel 9 to be effected from a remote location, suitably, the operator's seat on the harvester.

On that part of the shaft 41 which projects outwardly from the box section lever 69 is rotatably mounted a first wheel means 81 in the form of co-axial sprockets 83 and 85 secured together and of which the outer sprocket 85 is of smaller diameter than the inner sprocket 83 and the inner sprocket cooperates with a chain 87 driven by a sprocket 89 (see FIGURE 1) on a lay shaft to the rear of the first wheel means.

Rotatably carried on the short dead shaft at the upper end if the box-section lever 69 are second wheel means 91 which comprise an inner smaller diameter sprocket 93 and an outer larger diameter sprocket 95 respectively coplanar with the inner and outer sprockets of the first wheel means. An endless chain 97 cooperates with the outer sprockets 85 and 95 of the first and second wheel means whilst a further endless chain 99 cooperates with the inner sprocket 93 of the second wheel means and a sprocket 101 secured to the corresponding end of the reel axle which constitutes a third wheel means.

It will be evident that belts and pulleys can be substituted for the chains and sprockets.

During operation, when the rams 79 are actuated to effect movement of the reel in the fore and aft direction no change occurs in the tension in the chain 97 engaging the outer sprockets of the first and second wheel means. Also, since the links 63 are pivoted to the levers 69 on the axis of the second wheel means 91 and since the links 63 are disposed substantially to bisect the angle between the straight portions of the chain 99 coupling the second and third wheel means, irrespective of the position, in its range of fore and aft movement, of the reel, the change in tension in the chain coupling the second and third wheel means occasioned by the movement of the reel is negligible.

I claim:

1. Mechanism for effecting movement of the reel of a grain harvesting machine in a direction fore and aft of the machine including a reel supporting arm, a reel supporting bearing carried on and movable longitudinally with respect to the reel supporting arm, a lever pivotally mounted for rotation about an axis parallel with and rearwardly disposed with respect to the reel axis, a link connected with the lever at a point thereof spaced from the pivotal axis of the lever and with the reel supporting bearing, means for effecting pivotal movement of the lever, and, for the purpose of cooperating with reel driving endless band means, first wheel means rotatably mounted relative to the pivotal axis of the lever, second wheel means carried on the lever and rotatable about an axis spaced from the pivotal axis of the lever and third wheel means adapted to be secured to the reel.

2. Mechanism as claimed in claim 1, wherein the lever is pivotally supported for rotation about a transverse pivotal axis of the reel supporting arm towards a rear end thereof.

3. Mechanism as claimed in claim 1, wherein the reel driving endless band means comprise two endless bands one of which bands cooperates with a wheel element of the first wheel means and a wheel element of the second wheel means whilst the second band cooperates with a further wheel element of the second wheel means and with the third wheel means.

4. Mechanism as claimed in claim 1, wherein the link is connected to the lever so as to be pivotal about the axis of rotation of the second wheel means.

5. Mechanism as claimed in claim 1, wherein an hydraulic ram is provided for effecting pivotal movement of the lever.

6. Mechanism as claimed in claim 1, wherein the lever carries a pin which engages in a slot in the reel supporting arm.

7. Mechanism as claimed in claim 1, wherein there are provided spaced parallel interconnected reel supporting arms disposed at opposite ends respectively of the reel and each having slidably mounted thereon a reel supporting bearing, there being further provided respective levers associated with the arms and pivotally mounted for rotation about a common axis of rotation of the arms and links connected each with one of the reel supporting bearings and with the adjacent one of the levers at a point thereof spaced from the pivotal axis of the reel supporting arms.

References Cited by the Examiner

UNITED STATES PATENTS 2,957,296  10/1960  Waters _____ 56—220

FOREIGN PATENTS 822,889  11/1959  Great Britain.
862,015  1/1961  Great Britain.

ABRAHAM G. STONE, *Primary Examiner.*

ANTONIO F. GUIDA, *Examiner.*